April 26, 1960      J. P. LETO      2,933,783
WEATHER STRIP SEALING MEANS FOR DOOR AND LIKE OPENINGS
Filed March 7, 1958
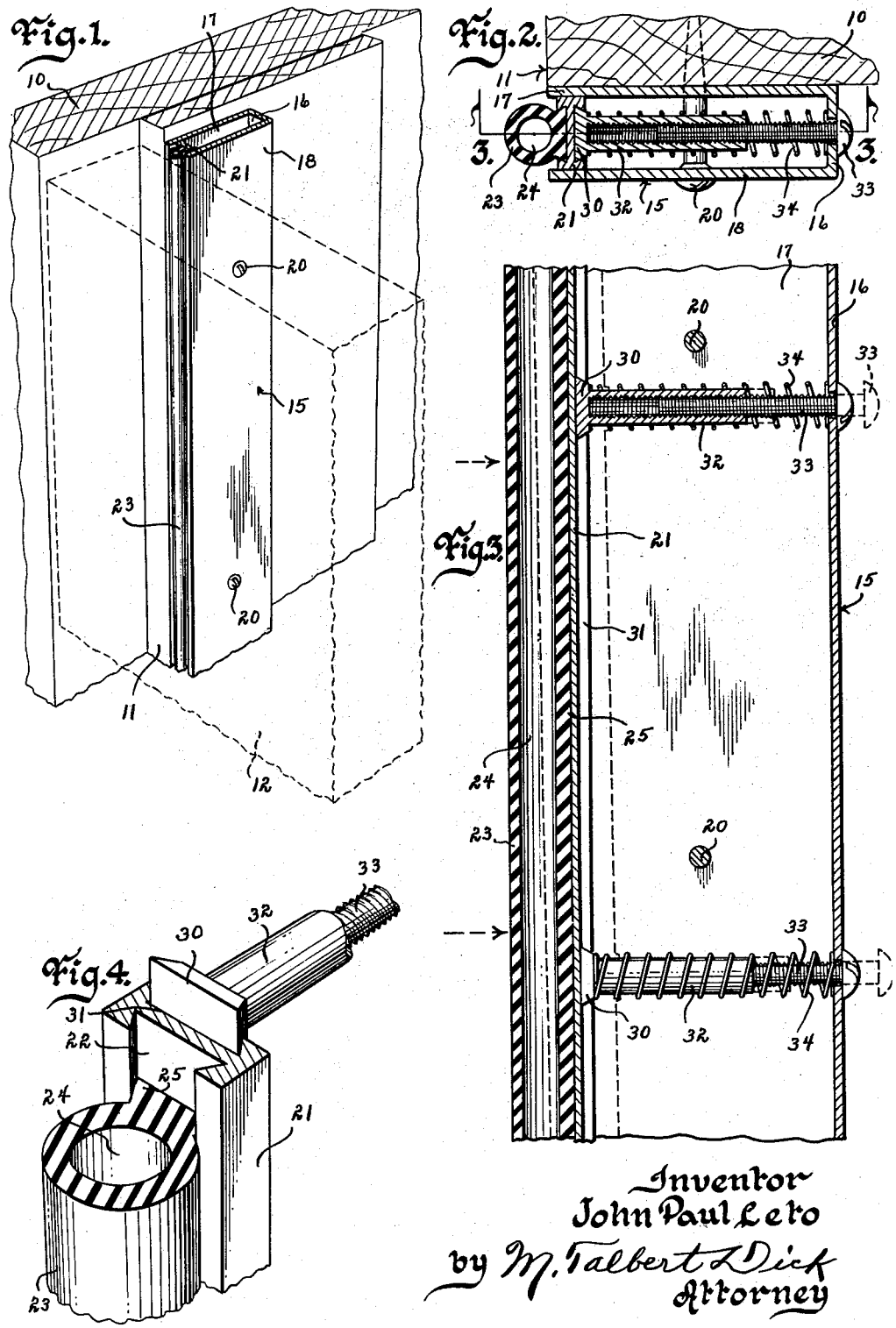
Inventor
John Paul Leto
by M. Talbert Dick
Attorney

United States Patent Office 2,933,783
Patented Apr. 26, 1960

2,933,783

WEATHER STRIP SEALING MEANS FOR DOOR AND LIKE OPENINGS

John Paul Leto, Des Moines, Iowa

Application March 7, 1958, Serial No. 719,944

1 Claim. (Cl. 20—68)

This invention relates to weather stripping means and more particularly to an adjustable weather strip sealing means for door, window and like openings.

Weather stripping for doors has long been used. In general, such stripping is nailed to the casing of the door opening and is of resilient characteristic so that it will yieldingly engage the door when the door is in closed position, thus sealing any space between the door and casing for preventing the passage of air, moisture or insects. While such means is of great value, it usually is not long before either the door and/or the casing becomes warped or sagged, and the effectiveness of the sealing action is destroyed. In many cases, the weather stripping even prevents the complete closing of the door. Still another objection to herebefore weather stripping means is that it is of relatively short life. Still another objection is that it may not properly fit the door at time of installation due to the fact that its proper position cannot be ascertained prior to its installation.

Therefore, one of the principal objects of my invention is to provide a weather strip sealing means that may be easily and quickly adjusted to compensate for the warping and sagging of doors and door frames.

A further object of this invention is to provide a weather and insert sealing means for doors and door openings that may be installed and then adjusted for fit.

Still further objects of my invention are to provide an adjustable weather strip sealing means that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Fig. 1 is a perspective view of a section of my device installed and in use;

Fig. 2 is an enlarged cross sectional view of my adjustable weather strip sealing means and more fully illustrates its construction;

Fig. 3 is an enlarged longitudinal sectional view of the device taken on line 3—3 of Fig. 2; and Fig. 4 is an enlarged perspective cross sectional view of the movable portion of the device.

In the drawings, I have used the numeral 10 to designate the casing frame of a door opening having the usual shoulder jam 11 and which engages and acts as a stop to the door 12, when the door is in a closed position, as shown by broken lines in Fig. 1.

It is to such a door casing frame that I install my weather strip sealing device and which I will now described in detail. My device may be installed on each side of the casing frame and also at its top.

The numeral 15 generally designates the frame housing of my device, U-shaped in cross section, and having its side facing the door opening. The numeral 16 designates the other side of the housing, the numeral 17 its back, and the numeral 18 its front. The distance between the back 17 and the front 18 is much less than the width of the back and front. This housing 15 is therefore rectangular in cross section and acts as a bearing housing for the movable unit portion of the device. To install my device, strips of this housing are placed on the casing frame with the back 17 adjacent the casing frame, and with the open side of the housing 15 substantially flush with the jamb 11, as shown in Fig. 1. The housing 15 is rigidly secured to the casing frame by any suitable means, such as by screws 20 extending through the housing and threaded into the casing frame 10.

The numeral 21 designates a longitudinal bar laterally slidably mounted in the frame housing 15, as shown in Fig. 2. In the face of this bar and extending toward the open end of the housing 15 is a longitudinal dovetailed groove 22, as shown in Fig. 4. The numeral 23 designates an elongated flexible resilient door engaging member. This member 23 may be round or rectangular in cross section and may have a hollow core 24, if desired. It may be made of rubber-like material, plastic, or like. Preferably, it should be both flexible and resilient. The numeral 25 designates an elongated dovetailed tongue portion formed along the back of the member 23 and engages and is complementary to the dovetailed groove 22, as shown in Fig. 4. When installed, the member 23 will extend through and beyond the open end of the housing 15, as shown in Fig. 2. The numeral 30 designates a plurality of spaced apart tapered heads slidably mounted in and complementary to a longitudinal dove-tailed groove 31 in the back of the bar 21. The numeral 32 designates a threaded cylinder on the back of each of the heads 30. These cylinders 32 extend horizontally toward the far side 16 of the housing 15, but terminate a substantial distance from the side 16, as shown in Fig. 3. The numeral 33 designates a headed and threaded screw slidably extending horizontally through the side 16 into the housing 15 and threaded into each of the cylinders 32. The numeral 34 designates a coil spring embracing each cylinder 32 and its screw 33. The forward end of the spring 34 engages the back of the adjacent head and its other end engages the inner side of the side 16. The purpose of these springs 34 is to yieldingly hold the bar 21 toward the open side of the housing 15. The screws 33 individually adjustably limit the movement of the bar 21 toward the open side of the housing 15. The springs yieldingly hold the movable unit toward the door. With the screws 33 properly adjusted, the resilient stripping 23 therefore will be yieldingly held beyond the plane of the door jamb 11. The amount of distance it is permitted to protrude beyond the door jamb will depend on the length of the threads of the screws 33 that are screwed into their cylinders 32. If a screw 33 is turned to the right, it will accordingly draw the bar 21 in a direction from the door. If the screw 33 is turned to the left, it will permit the bar 21 to move further toward the door. The door, when closed, should contact the stripping 23. The resiliency of the stripping 23 and the resiliency of the coil springs will yieldingly (within their limits) hold the stripping into contact with the closed door. After installation, the adjustment is made by either screwing the screws 33 inwardly or outwardly, as the situation requires. If, after installation, due to warping or sagging of either the door casing or door, it is a simple matter to readjust the device by the screws 33. The door may engage the stripping and move the bar 21 toward and against the coil springs and, when this occurs, the screws 33 slidably move through the side 16, as shown by broken lines in Fig. 3. By this construction, there is much tolerance and the minute adjustment of the screws 33 is therefore not critical.

While I have described my device as applicable to doors, obviously, it may be used for the sealing of windows, lids, and like.

Some changes may be made in the construction and arrangement of my weather strip sealing means for door and like openings without departing from the real spirit and purpose of my invention, and it is my intention to cover by my claim, any modified forms of structure or use of mechanical equivalents which may be reasonably included within their scope.

I claim:

In a weather strip sealing means, a housing having an elongated slot opening, a bar laterally slidably mounted in said housing, a door engaging strip on said bar projecting from said slot opening, a dovetailed groove in the back of said bar, a plurality of spaced apart tapered head members in said dovetailed groove, a post cylinder on each of said head members, a threaded screw slidably extending in said housing and threaded into each of said post cylinders, and a coil spring embracing each of said post cylinders and its screw, and having one end engaging said bar and its other end engaging said housing.

References Cited in the file of this patent

UNITED STATES PATENTS

| | | |
|---|---|---|
| 414,579 | Price | Nov. 5, 1889 |
| 1,615,580 | Hamel | Jan. 25, 1927 |
| 1,948,017 | Wuebling | Feb. 20, 1934 |
| 2,119,667 | Crowe | June 7, 1938 |

FOREIGN PATENTS

| | | |
|---|---|---|
| 488,511 | Great Britain | July 8, 1938 |